July 11, 1939.   B. COOPER   2,166,090
TREADLE CONTROLLED SYSTEM
Filed Aug. 3, 1935
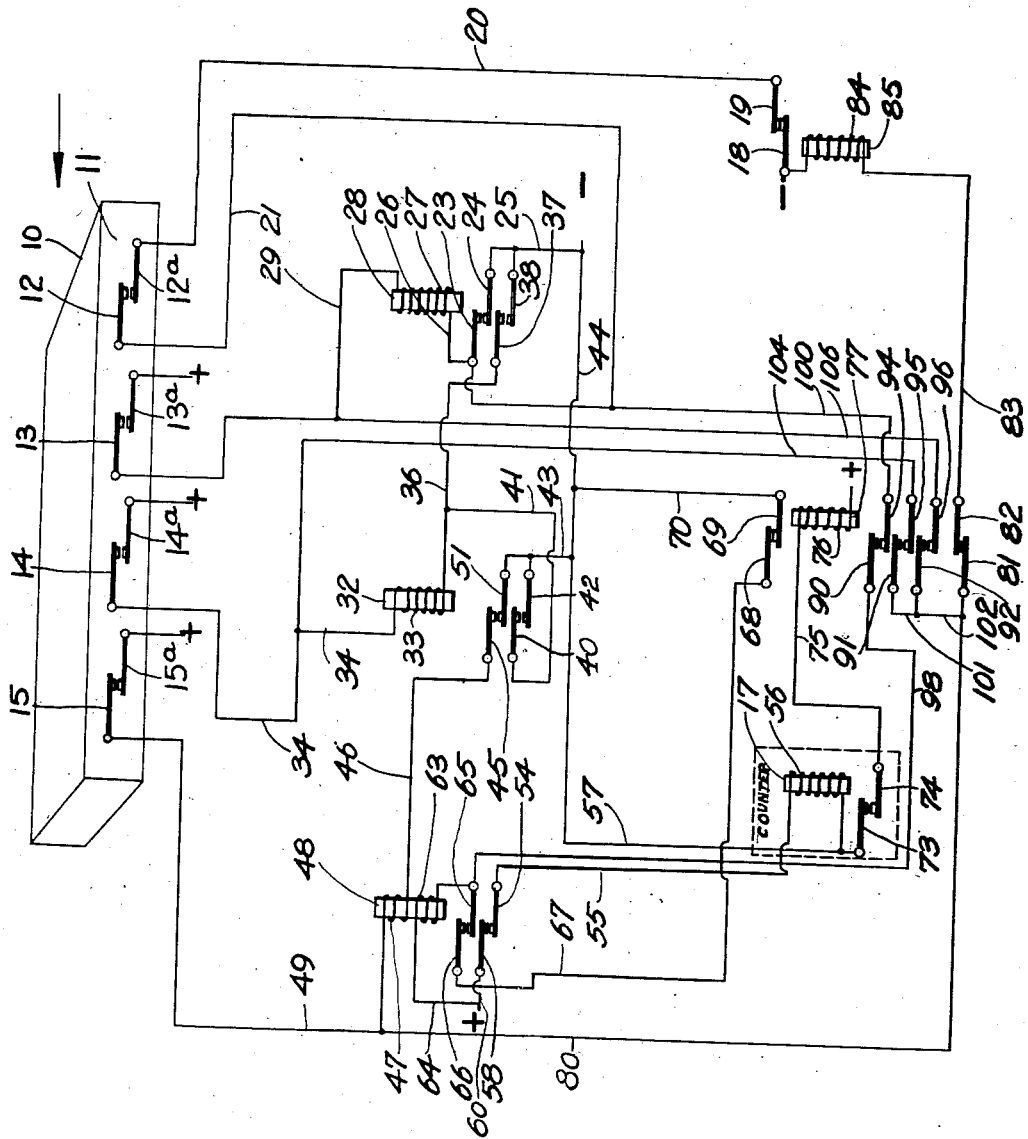
INVENTOR.
Benjamin Cooper
BY
Judah B. Felshin
ATTORNEY.

Patented July 11, 1939

2,166,090

UNITED STATES PATENT OFFICE 2,166,090

TREADLE CONTROLLED SYSTEM

Benjamin Cooper, New York, N. Y.

Application August 3, 1935, Serial No. 34,525

12 Claims. (Cl. 235—92)

This invention relates to a treadle controlled system for operating electrical printing counters and the like devices.

An object of this invention is to provide a system of the character described for controlling the operation of an electric counter by passage of a vehicle over a treadle embedded in a roadway, the system including means for actuating the counter each time the front or rear wheels of a vehicle roll over the treadle, when moving forwardly.

A further object of this invention is to provide in a system of the character described, means to prevent actuation of the counter should a vehicle be driven backwardly over the treadle, whereby the system is unidirectional and the counter can be operated only when the vehicle rolls over the treadle in one direction.

Vehicles mounting the treadle often stop while the wheels thereof are still on the treadle and due to vibration caused by the running motor oscillate or vibrate back and forth, whereby the wheels roll rearwardly and forwardly while still in contact with the treadle. It is therefore a further object of this invention to provide in a system of the character described, means to prevent the counter from being actuated more than once should the wheels of the vehicle passing onto the treadle cause actuation of the counter and then oscillate or roll backward and forward while still in contact with the treadle.

It is a still further object of this invention to provide an improved system of the character described, which shall be relatively inexpensive to manufacture and install smooth and positive in operation, and withal practical and efficient to a high degree in use.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible embodiments of this invention.

The single figure of the drawing is a diagrammatic representation of a system embodying the invention.

Referring now in detail to the drawing wherein is shown in diagrammatic form a system embodying the invention, 10 designates a treadle which may be embedded in a roadway, transversely thereof, and which is adapted to be traversed by vehicles passing over the roadway. The treadle 10 may be constructed substantially as shown and described in my copending application, Ser. No. 635,727, filed October 1, 1932. The same may comprise a rubber block or casing 11 in which are mounted a plurality of pairs of elongated, parallel contacts 12, 12a; 13, 13a; 14, 14a; and 15, 15a. Said pairs of contacts constitute switches which are normally open but which are made successively and broken successively as the wheels of a vehicle pass over the treadle. The contacts 13a, 14a and 15a are connected to the plus side of an electric power supply. Preferably, the switches are spaced apart about three inches so that as the front or rear wheels of a vehicle pass over the treadle the switch 12, 12a is first closed and as the wheels advance, the switch 13, 13a also closes. As the wheels continue to advance, the switch 12, 12a opens and the switch 14, 14a closes. As the wheels continue to advance, the switch 13, 13a opens and the switch 15, 15a closes. As the wheels continue advance, the switch 14, 14a opens and as the wheels roll off the treadle, the switch 15, 15a opens. Thus, the switches do not open until the next succeeding switch closes so that adjacent pairs of switches are closed simultaneously.

Means is provided for energizing a counter relay 17 for operating a printing counter when the front or rear wheels of a vehicle (front or rear wheel in case of a motorcycle), pass over the treadle, making and breaking the switches successively, as described above, whereby the vehicles passing over the treadle may be counted. To this end there is provided a movable switch arm 18 connected to a minus terminal of an electric power supply. Said switch arm 18 normally contacts a fixed contact 19 connected by wire 20 to the contact 12a. The contact 12 is connected by wire 21 to a fixed contact 23. The contact 23 is adapted to be engaged by a movable switch arm 24 connected by wire 25 to the minus side of an electric power supply. The contact 23 is connected by wire 26 to the coil 27 of a relay 28, said coil being connected by wire 29 to contact 13. When the coil 27 is energized, the relay 28 picks up the switch arm 24 moving the same into engagement with the contact 23.

When the wheels of a vehicle close the switch 12, 12a, the circuit is not completed through the relay 28 until the succeeding switch 13, 13a is also closed. When the latter switch is closed by the front wheels of the vehicle, the circuit through the relay 28 is completed and the coil 27 energized to pick up the switch arm 24 into engagement with the contact 23. Thereafter, as the wheels roll off the switch 12, 12a the relay 28 remains energized, the circuit passing from the minus side of the power supply through the wire 25, switch 24, 23, coil 27, wire 29 and switch 13, 13a.

There is further provided a second relay 32 having a coil 33 connected by wire 34 to the contact 14 and by wire 36 to a fixed contact 37 cooperating with a movable switch arm 38. The latter is connected to the wire 25 and adapted to be picked up by the relay 28 into engagement with the fixed contact 37.

When the wheels of a vehicle advance on the treadle closing the switch 14, 14a, the coil 33 is energized since the switch arm 38 has been picked up by the relay 28 into engagement with fixed contact 37.

To retain relay 32 in energized condition even when the front wheels roll beyond switch 13, 13a, opening the same, there is provided a fixed contact 40 connected by wire 41 to the coil 33. A complementary movable switch arm 42 adapted to be picked up by the relay 32 into engagement with contact 40, is connected by wires 43 and 44 to the minus side of the power supply. Thus, after the front wheels of the vehicle have contacted the switch 14, 14a and energized the relay 32, the relay remains energized even after said wheels roll off the switch 13, 13a, the circuit passing through the switch 14, 14a, wire 34, coil 33, wire 41, switch 40, 42, and wires 43, 44 to the minus side of the power supply.

There is further provided a fixed contact 45 connected by wire 46 to the coil 47 of a relay 48, said coil being connected by wire 49 to the contact 15. A movable switch arm 51 complementary to the fixed contact 45 is connected by wire 43 to the minus side of the power supply, and is adapted to be picked up by the relay 32 into engagement with the contact 45. Thus when the front wheels of the vehicle advance on the treadle and close the switch 15, 15a, the relay 48 becomes energized through the circuit passing through said switch 15, 15a, wire 49, coil 47, wire 46, switch 45, 52 and wires 43, 44 connected to the minus side of the power supply.

For the purpose hereinafter appearing there is provided a fixed contact 58 connected by wire 60 to the plus side of the power supply. Associated with the relay 48 is a movable switch arm 54 connected by wire 55 to the coil 56 of the counter relay 17, said coil being connected by wire 57 to the wire 44 leading to the minus side of the power supply. The switch arm 54 is adapted to be picked up by the relay 48 into engagement with the contact 58 to complete the circuit through the relay 17 for energizing the counter relay and operating the counter. Thus as the front wheels of the vehicle advance over the treadle making the switches 12, 12a; 13, 13a; 14, 14a; and 15, 15a, the counter is actuated.

Means is provided to ensure complete actuation of the counter even when the front wheels pass over the treadle at a high speed. To this end, there is provided a second coil 63 on relay 48, connected by wire 64 to the plus side of the power supply. The coil 63 is also connected to a movable switch arm 65 adapted to be picked up by the relay 48 into contact with a fixed contact 66 connected by wire 67 to a fixed contact 68 normally engaged by a movable switch arm 69 connected by wire 70 to the wire 44 and hence to the minus side of the power supply.

Thus when the switch 15, 15a is closed and the relay 48 energized to close the switch 66, 65, said relay will remain energized even after the wheels of the vehicle roll off the treadle and the switch 15, 15a again opens, since the circuit for the relay 63 remains closed through the switch 65, 66, wire 67, switch 68, 69 and wire 70. Since the relay 48 remains energized, the switch 54, 58 remains closed and the circuit through the counter relay 17 remains closed to insure proper actuation of the printing counter.

Means is provided to de-energize the counter relay 17 as soon as the counter has operated. To this end, the coil 56 for the counter relay 17 is connected to a fixed contact 73 adapted to be contacted by a movable switch arm 74 connected by wire 75 to the coil 76 of a cut off relay 77, said coil being connected to the plus side of the power supply. When the cut off relay is energized the same is adapted to move the switch arm 69 out of engagement with the fixed contact 68 to break the circuit through the coil 63 of relay 48.

When the counter relay 17 is energized sufficiently to operate the counter, the movable switch arm 74 is picked up into engagement with the fixed contact 73 to complete the circuit through the cut off relay 77 for opening the switch 68, 69. Upon this occurrence, the circuit through the coil 63 is broken, de-energizing the relay 48 and permitting the switch arm 54 to move out of engagement with respect to the fixed contact 58, and hence breaking the circuit through the counter relay 17 for de-energizing the latter.

When the counter relay 17 is de-energized the movable switch arm 74 will move away from the fixed contact 73, breaking the circuit through the cutoff relay 77 and permitting the switch arm 69 to move again into contact with the fixed contact 68.

It will now be understood that as the front wheels of a vehicle pass over the treadle, making and breaking the four treadle switches successively, the counter will be actuated and the counter relay will be de-energized when the front wheels roll off the treadle, bringing the system to its original condition. The counter is then actuated twice for each four wheel vehicle, once by the front wheels and once by the rear wheels. Actually the axles of the vehicle are counted and by noting the number of six wheel (three axle) vehicles, the actual number of vehicles passing the treadle may be easily computed.

Means is provided to prevent actuation of the counter should a vehicle ride over the treadle rearwardly or from left to right, as shown in the drawing, whereby the system is uni-directional and the counter will only be actuated when vehicles pass over the treadle in one direction only. To this end, the wire 49 (and hence the contact 15) is connected by wire 80 to a fixed contact 81. A movable switch arm 82 normally in engagement with the contact 81, and adapted to be moved out of such engagement by cut off relay 77, is connected by wire 83 to the coil 84 of a relay 85. The relay 85, when energized, is adapted to move the switch arm 18 out of engagement with respect to the fixed contact 19.

Should a vehicle move over the treadle in direction opposite to the direction of the arrow in the drawing, the switch 15, 15a will first be closed to complete the circuit through the relay 85 for moving the switch arm out of contact with the fixed contact 19 and breaking the circuit through the relay 28.

The counter relay 17 cannot become actuated unless the relay 48 is energized. The relay 48, however, cannot be energized unless the relay 32 is energized. Since the circuit through the relay 28 is broken as soon as the switch 15, 15a is closed by reason of the switch arm 18 being moved away from the fixed contact 19, the relay 48 cannot be energized even if the switches 15, 15a; 14, 14a; 13, 13a; and 12, 12a are closed in succession as the wheel moves from left to right over the treadle.

When the vehicle moves in said reverse direction over the treadle and the wheels pass the switch 15, 15a, which is hence permitted to open, the circuit through the relay 85 breaks to permit the switch arm 18 to move back into engagement with the fixed contact 19. However, the counter relay cannot become energized because the switch 15, 15a is then open.

It will now be understood that if a vehicle rides backwards or from left to right over the treadle (looking at the drawing), even if the tires on the vehicle are soft and sufficiently large to close all the four switches at one time there will be no count registered since the closing of the switches 15, 15a will energize relay 85 and open the switch 18, 19 and prevents closing of the circuit through the relay 28.

Vehicles mounting the treadle often stop while the wheels thereof are still on the treadle and due to vibration caused by a running motor, oscillate or vibrate back and forth, whereby the wheels roll rearwardly and forwardly while still in contact with the treadle. Means is therefore provided for preventing the counter from being actuated more than once as the wheels roll back and forth on the treadle. To this end there are provided three fixed contacts 90, 91 and 92 adapted to be engaged by three movable switch arms 94, 95 and 96, respectively. The movable switch arms 94, 95 and 96 are adapted to be picked up by the relay 77 when the latter is energized into engagement with the fixed contacts 90, 91 and 92, respectively. The contact 90 is connected by wire 98 to the coil 63. The switch arm 94 is connected by wire 100 to the wire 21. The contacts 91 and 92 are interconnected by wire 101 which is connected by wire 102 to the wire 80. The switch arm 95 is connected by wire 104 to wire 34. The movable switch arm 96 is connected by wire 106 to the wire 29.

When the front wheels of a vehicle advance on the treadle until the switches 14, 14a and 15, 15a are closed, the coils 33 and 47 are energized. The relay 48 picks up the movable switch arm 54 into engagement with the fixed contact 58 to complete the circuit through the counter relay 17 which in turn picks up the switch arm 74 into engagement with the contact 73 to complete the circuit through the cut-off relay 77, the latter opening the switch 68, 69 and picking up the switch arms 94, 95 and 96 into engagement with the fixed contacts 90, 91 and 92, respectively. The relay 77 also picks up switch arm 82 to open the switch 81, 82. The counter relay 17 and the cut-off relay 77 thus remain in energized condition as long as the switches 14, 14a and 15, 15a are closed. Should the wheels advance sufficiently to permit opening of the switch 14, 14a, the relay 32 remains energized through the following circuit: switch 15, 15a, wire 49, wire 80, wire 102, wire 101, switch 91, 95, wire 104, wire 34, coil 33, wire 41, switch 40, 42, wires 43 and 44. The circuit is thus complete from the plus to the minus side of the power supply and passing through the coil 33.

Since the relay 32 remains energized when the switch 14, 14a opens, the switch arm 51 remains in engagement with the contact 45 whereby the circuit through the coil 47 remains closed and the relay 48 energized. Thus the relay 48 remains energized even after the switch 14, 14a opens.

If the wheels start rolling backwards on the treadle (without rolling forwardly off the treadle to open the switch 15, 15a) the counter relay 17 will remain energized as explained hereinafter. If the wheels roll back sufficiently to close switch 14, 14a and then open the switch 15, 15a the relay 32 remains energized, since the circuit for the coil 33 is closed through the switch 14, 14a, wire 34, coil 33, wire 41, switch 40, 42, wires 43, 44. The circuit through the coil 47 likewise remains closed through the switch 14, 14a, wire 34, wire 104, switch 91, 95, wire 101, wire 102, wire 80, coil 47, wire 46, switch 45, 52 and wires 43, 44.

As the wheels continue to roll rearwardly closing the switch 13, 13a and permitting switch 14, 14a to open, the relay 32 remains energized by reason of the following completed circuit: switch 13, 13a, wire 106, switch 96, 92, wire 101, switch 91, 95, wire 104, wire 34, coil 33, wire 41, switch 40, 42 and wire 43, 44.

As long as the relay 32 remains energized, the relay 48 will remain energized and the counter relay will likewise remain energized. As the wheels continue to roll rearwardly closing the contact 12, 12a and opening the contact 13, 13a the circuit for coil 63 will close through the following circuit: wire 64, coil 63, wire 98, switch 90, 94, wire 100, wire 21, switch 12, 12a, wire 29 and switch 18, 19. If the circuit is complete through the coil 63 the relay 48 remains energized and the counter relay likewise remains energized. Thus, even if the wheels after having closed the switch 15, 15a to actuate the counter relay, roll rearwardly sufficiently to open the switches 15, 15a, 14a and 13, 13a, and close switch 12, 12a, the counter relay will remain in actuated condition so that when the wheels start to roll forwardly again, the counter will not be again actuated. Vibration back and forth of the wheels while on the treadle after having actuated the counter relay will not cause a subsequent actuation of the counter relay during such oscillation.

When the vehicle moves forwardly over the treadle and contacts the switch 15, 15a, the relay 48 is energized, the counter relay is energized and the cut-off relay also is energized. The cut-off relay, therefore, picks up the switch arm 82 to break the circuit through the relay 85. This prevents the relay 85 from being energized and prevents opening of the switch 18, 19. If the front wheels of the vehicle roll forwardly on the treadle closing the switch 15, 15a, to actuate the counter and then vibrate or roll rearwardly sufficient to close the switch 12, 12a, the relay 48 remains energized as stated above through the coil 63, wire 98, switch 90, 94, wire 100, wire 21, switch 12, 12a, wire 29 and switch 18, 19. The switch 18, 19, therefore, must be closed to keep the relay 48 energized and for this reason the switch arm 82 must be picked up to break the circuit through the relay 85 and prevent opening of the switch 18, 19.

It will now be understood that if the front wheels of the vehicle ride forwardly over the treadle a sufficient distance to close the switch 15, 15a the counter relay will be energized and will remain energized if any one of the other switches 12, 12a; 13, 13a; or 14, 14a are closed. Thus, if the vehicle cuts across the treadle at an angle, so that, for example, the right front wheel reaches the switch 15, 15a before the left front wheel, only one count will be registered on the counter if the angle is not so great that one wheel passes entirely over and off the treadle before the other wheel rolls onto the treadle. Rarely, of course, does a vehicle ride over a treadle at such an angle since the treadle is usually placed in a lane for a single vehicle.

The treadle contains more than two elongated parallel switches and for this reason it is footproofed, that is, all of the switches are not likely to be closed when the treadle is stepped upon by a casual pedestrian. If the treadle were to operate the counter when two switches are made, a person would be able to step on the treadle and actuate one switch with his heel and the other switch with the toe. However, the treadle herein comprises more than two switches and all of the switches must be closed to actuate the counter. With this construction a high degree of accuracy is obtained, as the treadle is only responsive to the rolling motion of the wheel.

It will thus be seen that there is provided a system in which the several objects of this invention are achieved and which is well adapted to meet the conditions of practical use.

As various possible embodiments might be made of the above invention and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a multi-switch member adapted to be embedded in a roadbed having four switches, an electric device, and means for producing an electric impulse in said device when the first switch is first actuated, the second switch thereafter actuated while the first switch is still in actuated condition, the third switch thereafter actuated while the second is still in actuated condition and the first switch is released and the fourth switch actuated while the third switch is still in actuated condition, and the second switch is released, said means being operable only upon actuating all four of said switches.

2. A treadle adapted to be embedded in a roadway thereof, and adapted to be contacted by the wheels of a vehicle riding thereover, more than two elongated parallel, spaced switches in said treadle, adapted to be actuated successively by the wheels of a vehicle passing over said treadle, adjacent switches being spaced apart less than three inches so that adjacent pairs of switches are actuated concurrently as the wheel rolls over the treadle, and whereby all of said switches are not likely to be actuated when stepped upon by a casual pedestrian, an electric device, and means for actuating said device when a wheel of a vehicle rolls over said treadle and successively actuates all the switches and concurrently actuates adjacent switches, said means being inoperable to actuate said device except upon actuation of all of said switches.

3. In combination with a treadle adapted to be embedded in a roadway and traversed by vehicles, more than two spaced, parallel switches within said treadle, an electro-magnet, said switches being spaced less than three inches apart so that when a wheel of a vehicle passes over the switch, the first switch is first actuated, the second switch is actuated while the first switch is still in actuated condition and each succeeding switch is actuated while the preceding switch is still in actuated condition, means for actuating the magnet when a wheel rolls over the treadle, said means being inoperable to actuate said magnet except upon actuation of all of said switches, and means for retaining said magnet in actuated condition should the wheel after rolling on the treadle in one direction a sufficient distance to actuate all of the switches and release a switch before the last switch, roll backwards to again actuate any of the switches before the last switch and release the last switch, and then roll forward again off the treadle.

4. In combination with a treadle adapted to be embedded in a roadway and traversed by vehicles, more than two spaced, parallel switches within said treadle, an electro-magnet, said switches being spaced less than three inches apart so that when a wheel of a vehicle passes over the switch, the first switch is first actuated, the second switch is actuated while the first switch is still in actuated condition and each succeeding switch is actuated while the preceding switch is still in actuated condition, and whereby all of said switches are not likely to be actuated when stepped upon by a casual pedestrian, means for actuating the magnet when a wheel rolls over the treadle, said means being inoperable to actuate said magnet except upon actuation of all of said switches, and means to prevent actuation of said magnet when a wheel of a vehicle rolls over the treadle in a reverse direction actuating the last switch before the first.

5. An elongated multi-switch treadle adapted to be embedded in a roadbed transversely of said roadbed, whereby the wheels of vehicles passing along the roadbed may roll over said treadle, more than two parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, and whereby all of said switches are not likely to be actuated when stepped upon by a casual pedestrian, an electric device, means for energizing said device when a wheel of a vehicle rolls over said treadle, said means being inoperable to energize said device except upon actuation of all of said switches and means for automatically deenergizing said device upon the same becoming energized.

6. An elongated multi-switch treadle adapted to be embedded in a roadbed transversely of said roadbed, whereby the wheels of vehicles passing along the roadbed may roll over said treadle, more than two parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, and whereby all of said switches are not likely to be actuated when stepped upon by a casual pedestrian, an electric device, means for energizing said device when a wheel of a vehicle rolls over said treadle, said means being inoperable to energize said device except upon actuation of all of said switches, means for automatically deenergizing said device upon the same becoming energized, and means in said circuit for insuring complete actuation of said device.

7. An elongated multi-switch treadle adapted to be embedded in a roadbed transversely of said roadbed, whereby the wheels of vehicles passing along the roadbed may roll over said treadle, a multiplicity of parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, an electric device, means for energizing said device when a wheel of a vehicle rolls over said treadle and actuates at least two of said switches, means for automatically deenergizing said device upon the same becoming energized, and means to prevent a second actuation of said device if a wheel of a vehicle, after rolling on the treadle in one direction a sufficient distance to actuate the last switch and release the switch immediately before the last switch, rolls in the opposite direction on the treadle, without going off the treadle, at least a sufficient distance to release the last switch and actuate a switch before the last switch, and then rolls in the first direction off the treadle.

8. An elongated multi-switch treadle adapted to be embedded in a roadbed transversely of said roadbed, whereby the wheels of vehicles passing along the roadbed may roll over said treadle, more than two parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, an electric device, means for energizing said device when a wheel of a vehicle rolls over said treadle, said means being inoperable to energize said device except upon actuation of all of said switches, means for automatically deenergizing said device upon the same becoming energized, means to prevent a second actuation of said device if a wheel of a vehicle, after rolling on the treadle in one direction a sufficient distance to actuate the last switch and release a switch before the last switch, rolls in the opposite direction on the treadle, without going off the treadle, at least a sufficient distance to release the last switch and actuate a switch before the last switch, and then rolls in the first direction off the treadle, and means to prevent actuation of said device when a wheel of a vehicle rolls over the treadle in a reverse direction.

9. An elongated multi-switch treadle adapted to be embedded in the roadbed transversely of said roadbed, whereby the wheels of vehicles passing along the roadbed may roll over said treadle, more than two parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, whereby all of said switches are not likely to be actuated by a pedestrian stepping on the treadle, an electric device, means for energizing said device when a wheel of a vehicle rolls over said treadle, said means being inoperable to energize said device except upon actuation of all of said switches, means for automatically deenergizing said device upon the same becoming energized, and means to prevent actuation of said device when a wheel of a vehicle rolls over the treadle in a reverse direction.

10. An elongated multi-switch treadle adapted to be embedded in a roadbed transversely of said roadbed, whereby the wheels of vehicles passing along the roadbed may roll over said treadle, more than two parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, an electric device, means for energizing said device when a wheel of a vehicle rolls over said treadle, said means being inoperable to energize said device except upon actuation of all of said switches, means for automatically deenergizing said device upon the same becoming energized, means for insuring complete actuation of said device when said wheel rolls over said treadle, and means to prevent a second actuation of said device if a wheel of a vehicle, after rolling on the treadle in one direction a sufficient distance to actuate the last switch and release a switch before the last switch, rolls in the opposite direction on the treadle, without going off the treadle, at least a sufficient distance to release the last switch and actuate a switch before the last switch, and then rolls in the first direction off the treadle.

11. An elongated multi-switch treadle adapted to be embedded in a roadbed transversely of said roadbed, whereby the wheels of vehicles passing along the roadbed may roll over said treadle, a multiplicity of parallel switches in said treadle disposed side by side, longitudinally of the treadle, in substantially the same horizontal plane, and adapted to be actuated successively by a wheel of a vehicle rolling over said treadle, the distance between adjacent switches being lesss than three inches, whereby adjacent switches are actuated concurrently by said wheel, an electric device, means for energizing said device when a wheel of a vehicle rolls over said treadle, and actuates said switches, and means to prevent a second actuation of said device if a wheel of a vehicle, after rolling on the treadle in one direction a sufficient distance to actuate the last switch and release the switch immediately before the last switch, rolls in the opposite direction on the treadle, without going off the treadle, at least a sufficient distance to release the last switch and actuate a switch before the last switch, and then rolls in the first direction off the treadle.

12. An elongated multi-switch treadle adapted to be embedded in a roadbed transversely of said roadbed, whereby the wheels of vehicles passing along the roadbed may roll over said treadle, a multiplicity of parallel switches in said treadle disposed side by side, longitudinally of the treadle, in substantially the same horizontal plane, and adapted to be actuated successively by a wheel of a vehicle rolling over said treadle, the distance between adjacent switches being less than three inches, whereby adjacent switches are actuated concurrently by said wheel, an electric device, means for energizing said device when a wheel of a vehicle rolls over said treadle, and actuates said switches, means for insuring complete actuation of said device when said wheeel rolls over said treadle, and means to prevent a second actuation of said device if a wheel of a vehicle, after rolling on the treadle in one direction a sufficient distance to actuate the last switch and release the switch immediately before the last switch, rolls in the opposite direction on the treadle, without going off the treadle, at least a sufficient distance to release the last switch and actuate a switch before the last switch, and then rolls in the first direction off the treadle.

BENJAMIN COOPER.